United States Patent [19]

Reinheimer et al.

[11] Patent Number: 4,619,503

[45] Date of Patent: Oct. 28, 1986

[54] TRANSMITTED LIGHT AND/OR INCIDENT LIGHT INVERSE MICROSCOPE

[75] Inventors: Guenter Reinheimer, Biebertal; Norbert Gaul, Oberbiel, both of Fed. Rep. of Germany

[73] Assignee: Ernst Leitz Wetzlar GmbH, Wetzlar, Fed. Rep. of Germany

[21] Appl. No.: 491,332

[22] PCT Filed: Aug. 25, 1982

[86] PCT No.: PCT/DE82/00169

§ 371 Date: Apr. 26, 1983

§ 102(e) Date: Apr. 26, 1983

[87] PCT Pub. No.: WO83/00745

PCT Pub. Date: Mar. 3, 1983

[30] Foreign Application Priority Data

Aug. 26, 1981 [DE] Fed. Rep. of Germany ....... 3133784
Aug. 17, 1982 [DE] Fed. Rep. of Germany ....... 3230504

[51] Int. Cl.$^4$ .................. G02B 21/06; G02B 21/18
[52] U.S. Cl. .................................... 350/511; 350/523
[58] Field of Search ............. 350/511, 502, 523, 527, 350/569, 507

[56] References Cited

U.S. PATENT DOCUMENTS

| | | | |
|---|---|---|---|
| 3,405,989 | 10/1968 | Mentink | 350/511 X |
| 3,437,395 | 4/1969 | Rosenberger et al. | 350/9 |
| 3,687,520 | 8/1972 | Nothnagle et al. | 350/523 X |
| 3,752,589 | 8/1973 | Kobayashi | 350/511 X |
| 4,210,384 | 7/1980 | Meyer et al. | 350/502 |

FOREIGN PATENT DOCUMENTS

| | | | |
|---|---|---|---|
| 0758192 | 4/1954 | Fed. Rep. of Germany | 350/511 |
| 1807713 | 6/1958 | Fed. Rep. of Germany | . |
| 2640974 | 3/1978 | Fed. Rep. of Germany | . |
| 2754498 | 6/1978 | Fed. Rep. of Germany | . |
| 0913921 | 12/1962 | United Kingdom | 350/502 |
| 2084754 | 4/1982 | United Kingdom | . |

OTHER PUBLICATIONS

Leitz Fluorovert: The inverted microscope for medicine and biology, Leitz Publication No. 520-094; W. Germany VIII/84.

Leitz Labovert: Inverted transmitted light microscope, Leitz Publication No. 520-091 a.

Leitz Metallovert: Inverted microscope for examining plane and polished sections, Leitz Publication No. 560-063.

R. Beck, "The technological development of inverted microscopes", Leitz Scientific and Technical Information, vol. VIII, No. 6, 1984.

H. A. Oehring, "Optische Instrumente", Messtechnik, 6/72.

*Primary Examiner*—John K. Corbin
*Assistant Examiner*—David Lewis
*Attorney, Agent, or Firm*—Schwartz, Jeffery, Schwaab, Mack, Blumenthal & Evans

[57] ABSTRACT

A transmitted light and/or incident light inverted microscope is described, which comprises a "C"-shaped microscope basic body (G), the free opening (Öf) of which is directed toward the observer (B). A particular construction feature is the preferably vertical disposition of the following microscope parts along the optical microscope axis (4)—from bottom to top—: Objective (1) - object (3) - condenser (2) - center (19a) of the binocular housing (5) (FIG. 1a). At the pure incident light inverted variant (FIG. 1c) the condenser (2) is dispensed with. The multiply bent imaging beam path runs through the inside of the basic body (G). According to an alternative solution the binocular housing (5) is disposed at the front face of the stand arm (A) directed toward the observer (B) (FIG. 1b). According to all embodiments, the observer (B) is provied with a direct view into the binocular (5) as well as onto the object (3) and to the adaptable top mounted or, respectively, side mounted attachment modules, such as, for example, a viewing screen (22) while in ergonomically optimum microscoping position (FIG. 4). In addition, the observer (B) without changing his position can directly and unimpededly perform manipulations at the object (3) from the free opening (Öf) as well as perform in an optimum way all necessary operating functions of the new provision. Additional provisions without exception are adapted to the part regions of the stand base (F) and/or the stand support (T) and/or the stand arm (A) for ergonomic reasons.

37 Claims, 11 Drawing Figures

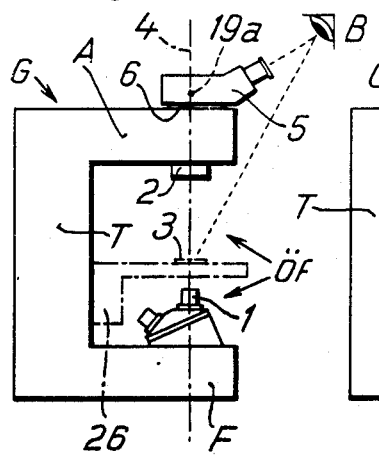
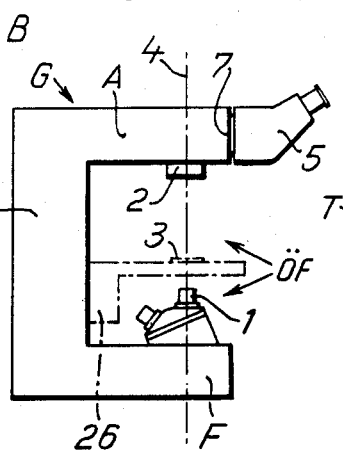
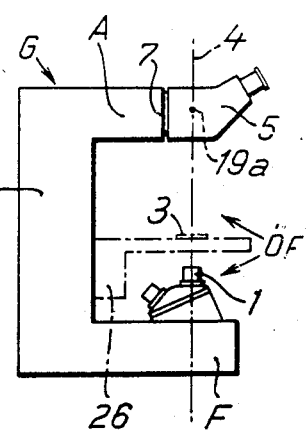
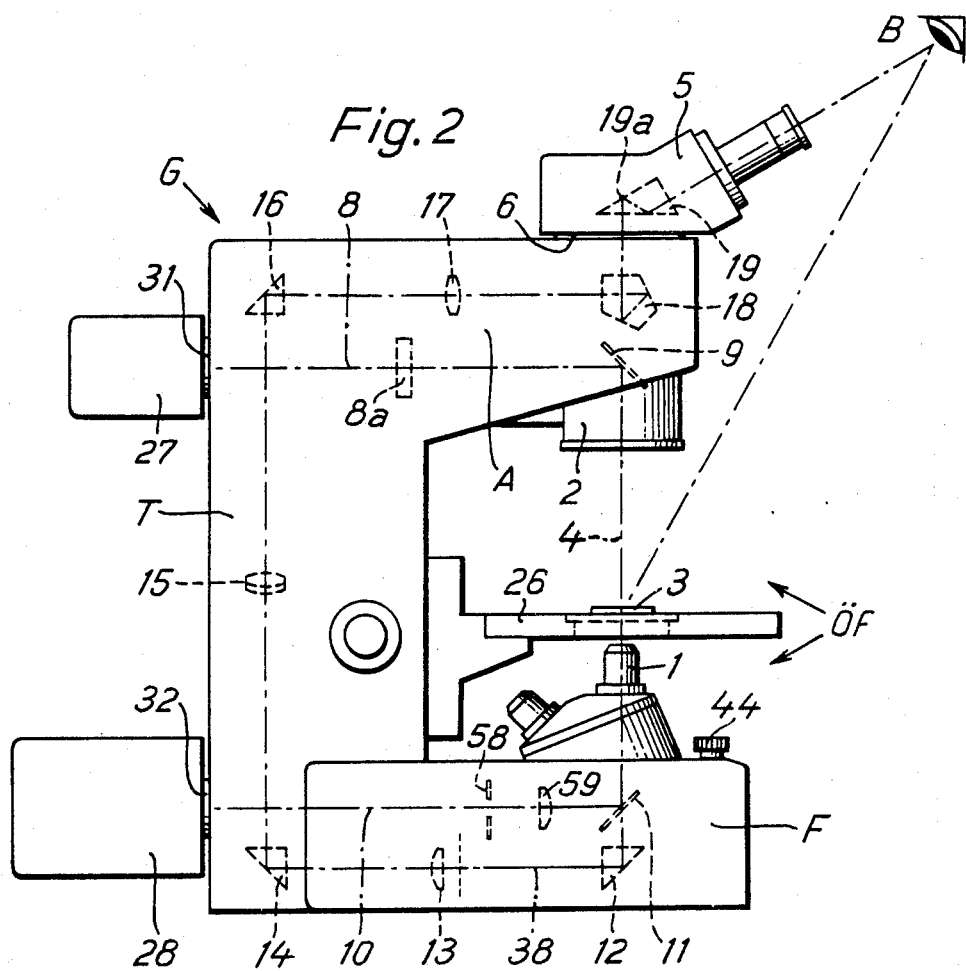

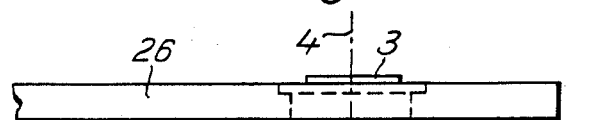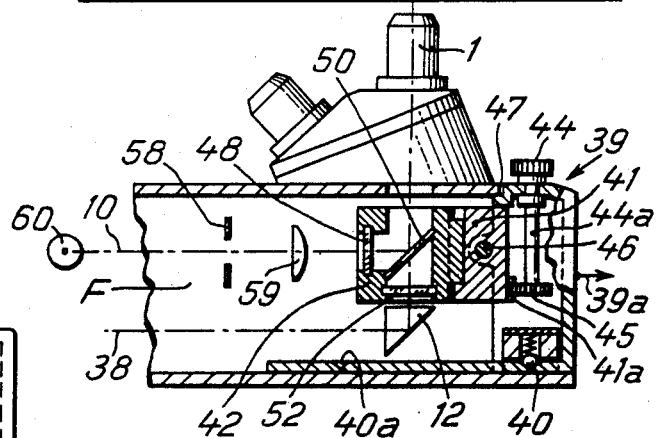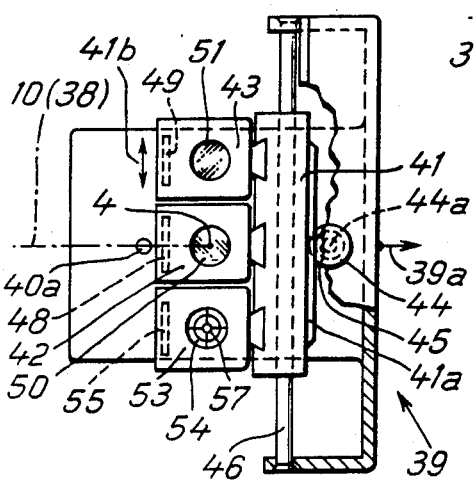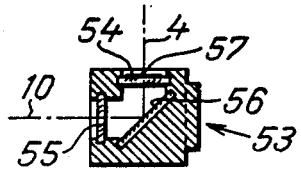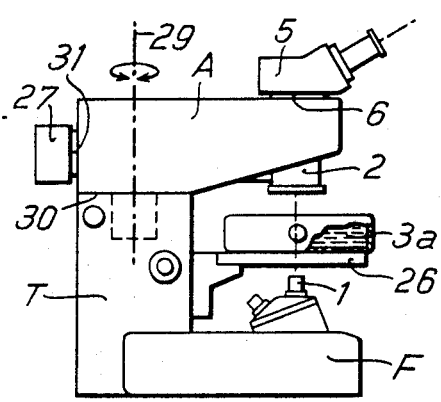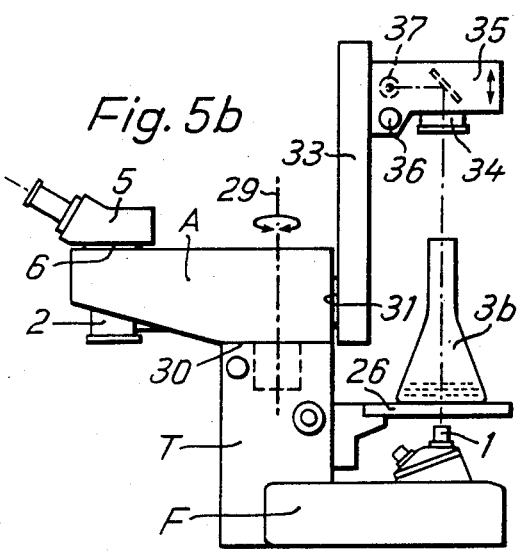

TRANSMITTED LIGHT AND/OR INCIDENT LIGHT INVERSE MICROSCOPE

BACKGROUND OF THE INVENTION

The invention relates to an inverted microscope for transmitted light, incident light, or combined transmitted light and incident light illumination.

Microscopes according to the construction of Le Chatelier, so-called "inverted" or "inverse" microscopes, are already known. For example, an inverted microscope is described and shown in the Leitz advertising material: "Inverted incident light microscope LEITZ EPIVERT" (Cat. No. 11.520.036 b, June 1978), where the basic body comprises a stand base with a lens turret, a vertical stand support mounted on the stand base, a level-adjustable object table coordinated to the stand support, a binocular housing attached on the top to the stand support, as well as a lamp housing attachable from the side to the front face of the base stand.

Also, a light microscope of inverted construction is known from the German Petit Patent DE-GM 7,628,471, which comprises a "U"-shaped basic body, where there is provided on the one "U"-arm a binocular housing, the attachment face of which is provided at the level of the object stage. A level-adjustable, tiltable, transillumination device is provided on the other "U"-arm of the body. A lens turret is disposed between the "U"-arms and is adjustable relative to the locally fixed object stage.

Furthermore, a transmission inverted microscope is also known from the Zeiss(Jena) manufacturer publication "TELAVAL" (IV 14-48 Ag 29/166/69 9830), where the "L"-shaped basic body comprises a stand base with a lens turret attached to its one side and where a vertical stand support is attached on the other side of the stand base. The upper side of the stand support is provided with a binocular housing and with a support for the illumination unit. The object stage can be adjusted with respect to its height level and is disposed at the stand support.

A transmission inverted microscope is known from the Reichert company publication "BIOVERT" (23,1 1. BIOVERT K I-II 4/71), which comprises a compact, rectangular parallelepipedal base body resting on a base plate. A photo-binotube is disposed at the upper end face of the basic body. The attachment surface of the photo-binotube is situated above in the plane of the object stage.

Finally, a device is known from the Olympus manufacturer publication "OLYMPUS Inverted Tissue Culture Microscope IMT" (M 35 E-676B), which substantially conforms in its main construction principles with the above-mentioned microscope types.

The following disadvantages are associated individually or in combination with the known microscope types:

(1) The observer is prevented or at least impeded in the free, direct view of the sample, or the object plane in operating position, respectively, because of the apparatus geometry employed with this known construction principle. Direct viewing is obstructed as follows:
  (a) by the binocular housing (Olympus, Leitz),
  (b) by microphotographic attachments adapted to the photoconnection of the binocular housing (Reichert),
  (c) by the supports for transmitted light devices, which are mounted on the stand support (Zeiss-Jena), or
  (d) by the stand support itself (Leitz, Zeiss-Jena).

(2) No possibility exists for directly handling and manipulating the object to be investigated from the direction of the observer.

(3) Flange mountable or tiltable transillumination devices, or attachable incident light devices are positioned such that they are disposed either at a relatively small distance from the observer and/or to the microscopic object, which, in particular, renders more difficult routine, long duration microscopy. In addition, this construction can lead to undesired influencing of special biological preparations (cultures and so on) based on heat development. In some cases, the illuminating devices are attached on the side of the base part of the total apparatus directed to the observer, which results in a substantial limitation of free and ergonomically proper microscoping positions of the observer, in particular during continuous operation. This construction is an impediment during manipulation of the object, or during the routine performance of the usual microscope operating functions.

SUMMARY OF THE INVENTION

It is an object of the present invention to provide a universally applicable inverted microscope based on a novel device conception with transmitted light, incident light, or combined transmitted light and incident light illumination, which allows the observer in microscoping position an unimpaired, direct view of the object as well as a direct, unimpaired handling of the object, or manipulation of the object, respectively, on the side toward the observer.

This object is achieved in combined transmitted light and incident light inverted microscopes according to the invention, wherein the stand support, the stand base and the overhanging stand arm form a "C"-shaped basic microscope body, and wherein the free opening of the basic microscope body is directed to the observer. The fixed optical axis of the microscope passes through the condenser, the objective, the object, and passes centrally through the top-mounting stop surface of a binocular housing. The stand support, the stand base and the overhanging stand arm form a "C"-shaped basic microscope body. The free opening of the basic microscope body is directed to the observer. The projection of the stand arm corresponds substantially to that of the stand base. A side-mounting stop surface for a binocular housing is provided on the face of the stand arm directed to the observer so as to be centrally transfixed by the image partial beam which passes through the stand arm.

The above object is achieved alternatively in another embodiment of an incident light inverted microscope according to the invention, wherein the stand support, the stand base and the overhanging stand arm form a "C"-shaped basic microscope body; wherein a free opening of the basic microscope body is directed toward the observer; wherein the projection of the stand arm is less than that of the stand base; and wherein a side-mounting stop surface for a binocular housing is provided on the front side of the stand arm such that the optical axis of the microscope, which is fixed through objective and the object, passes centrally through the binocular housing.

In all embodiments of the present invention, the transmitted light illumination beam and imaging partial beam run essentially parallel in the stand arm; and/or, the incident light illuminating beam and the imaging partial beam run essentially parallel in the stand base.

Further objects, features and advantages of the present invention will become apparent from description of preferred embodiments which follows, when considered together with the attached figures of drawing.

BRIEF DESCRIPTION OF THE DRAWINGS

In the drawings:

FIG. 1a shows a mostly schematic side view of the "C"-shaped basic body of a combined transmitted light and/or incident light inverted microscope, wherein attached binocular housing is positioned in the vertical optical axis;

FIG. 1b shows a mostly schematic side view of the "C"-shaped basic body of a combined transmitted light and/or incident light inverted microscope, wherein the attached binocular housing is positioned outside of the vertical optical axis;

FIG. 1c shows a mostly schematic side view of the "C"-shaped basic body of an incident light inverted microscope with attached binocular housing positioned in the vertical optical axis;

FIG. 2 shows the principal constructive and optical setup of the combined transmitted light and incident light inverted microscope according to the invention;

FIGS. 5a and 5b show a transmitted light and/or incident light inverted microscope with a pivotable upper part in each of two working positions;

FIG. 6a shows a schematic, detailed side-view of a fluorescence illuminator component disposed in the stand base;

FIG. 6b shows a deailed view corresponding to FIG. 6a without the lens turret; and FIG. 6c shows a modular alignment insert.

DETAILED DESCRIPTION OF THE PREFERRED EMBODIMENTS

A microscope basic body G according to the invention, having the shape of a canted "C" and comprising a stand base F, a stand support T, and a stand arm A is shown in FIG. 1. The free opening (Öf) of the basic body G is directed toward the observer. An object stage 26 is slidably supported at different height levels either by the stand support T or by the stand base F (compare FIG. 3) in a known manner. The mostly schematic microscope housing comprises a more or less "E" shape when the object stage 26 is taken into consideration.

Figure 3:
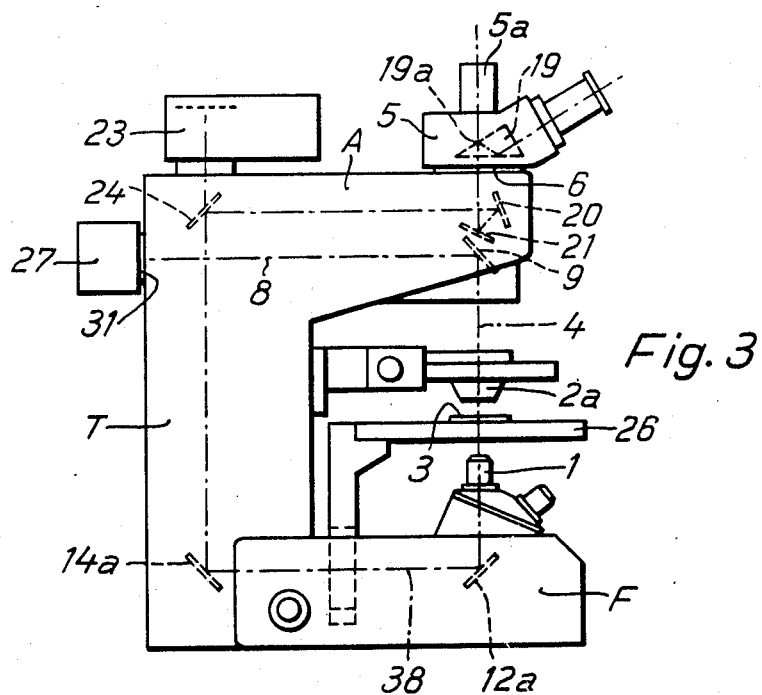
FIG. 3 shows a transmitted light variant of the inverted microscope with special condenser and a first top-mounting attachment.

Even though the microscope basic body G shows right angles between the stand support T and the stand base F, or the stand arm A, respectively, in FIGS. 1a-1c, rounded or slightly arched angles, or angles differing from 90 degrees may also be provided between the individual elements T, F, A of the basic body G. It is also not absolutely necessary that the stand support T and the stand base F are disposed in planes parallel to each other. For reasons of ergonomics, and, more importantly, based on constructive (stability) reasons, the basic body G comprises, preferably, a horizontal stand base F, a vertical stand support T and a horizontally overhanging stand arm A. It is possible that the base body G can be formed as a single piece (FIGS. 1a, 1c), comprise two modular parts (F, T+A; compare FIGS. 2-4) or comprise three modular parts (F, T, A), respectively. It is also possible that the stand support T can be disposed either at the top side of the stand base F (FIG. 4), or partially in, and partially on the stand base F (FIGS. 2, 3). The analogue holds for the side attachment region between the stand support T and the stand arm A.

A principal novel idea relating to the constructive arrangement in FIGS. 1a and 1c (FIG. 1a: transmitted light inverted variant, or combined transmitted light/incident light inverted variant), respectively, comprises that the condenser 2 is disposed in the, preferably vertical, optical axis 4 of the microscope, defined by the objective and the centrally positioned microscopic object 3. An "optically effective center" 19a, is understood as the point at which the imaging beam passing into the binocular housing 5 is partially (FIG. 3) or fully (FIGS. 2, 4) reflected, in order to pass into the proper ocular tube (binocular tube) after, possibly required, subsequent, total reflection. According to a preferred embodiment of the transmitted light, or of the combined transmitted light/incident light variant (FIG. 1a), and in addition to the sequence (from top to bottom) of objective 1, object 3, condenser 2; the binocular housing 5 is disposed above the condenser 2, and the housing is disposed with its optically effective center 19a, or the center of its top-mounting stop surface 6, respectively, positioned along the optical axis 4 of the microscope.

A variant possible in principle is shown in FIG. 1b, wherein the side-mounting stop surface 7 is centrally transfixed by the imaging beam (not shown). All three variants (FIGS. 1a-1c) are conceived such that the binocular housing 5 is disposed above the plane of the object stage 26. The observer B can, in an ergonomically optimum seating position, alternatively view the microscopic image in the binocular 5 and view the object 3 on the microscope stage 26 without disadvantageously changing his assumed position. It is also of particular importance that apparatus and manual manipulations of the preparation (such as stirring, adding (withdrawing) of materials to (from) the preparation, selecting mixtures of materials, marking details of the object, direct observation of cuvette circulation, rapid exchanges of samples during routine investigations, direct observation of segregation processes and of crystallization in aqueous solutions, rapid positioning of large volume sample containers on the object stage 3, etc.) can be performed from the free opening side (Öf), by the observer himself without giving up or, respectively, changing his ergonomic seating position.

Figure 4:
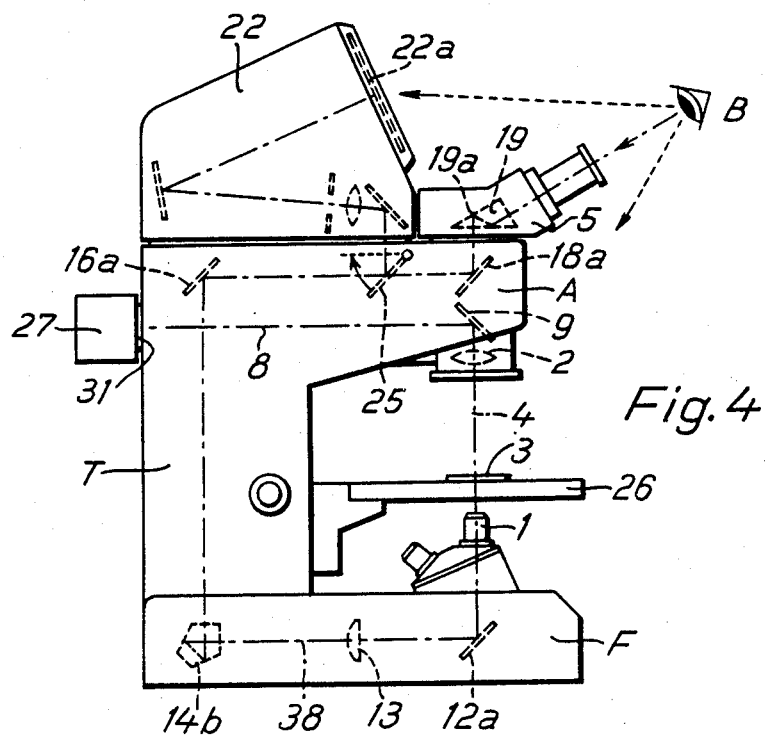
FIG. 4 shows a further transmitted light variant with a second top-mounting attachment.

The illumination beam pathways for the transmitted light and the incident light variants, and the path of the imaging beam are schematically shown in FIG. 2. In all embodiments, the transmitted light illuminating beam runs essentially parallel to the imaging partial beam in the stand arm; and/or, the incident light illuminating beam runs essentially parallel to the imaging partial beam in the stand base. Only the most important beam cross-section-changing and beam-redirecting construction parts are entered in the drawing. Of course, it is also possible to provide equivalent elements instead of the construction components shown. This is sketched by way of example in the otherwise analogous beam paths of the FIGS. 2-4. According to FIG. 2, a transmitting light illuminating unit 27 is connected to the upper part of the stand support T or, respectively, to the rear part of the stand arm A directed away from the observer B. The illuminating unit 27 is mechanically and/or electrically connected with the basic body G via a flange area disposed remote from the observer. The illuminating beam 8, coming from a light source not shown, encounters a first deflecting element 9 provided as a full mirror, which is disposed at a 45 degree position in the vertical axis 4 of the microscope. The beam then strikes the object 3, situated on the object stage 26, after passing through a condenser 2 disposed at the bottom side of the stand arm A. The imaging beam coming from object 3 passes, after leaving the objective 1, a first dividing mirror 11, which is provided for the redirection of the incident light illuminating beam path 10. The beam is then led through a second deflecting element 12, which can be provided as a glass prism or as a full mirror 12a (FIG. 3), in the direction of the partial section 38 in the stand base F. The beam then rapidly passes the stand support T after another direction change by a third deflecting element 14, which, instead of the glass prism shown, can also be a full mirror 14a (FIG. 3) or a pentaprism 14b (FIG. 4). By way of a fourth deflecting mirror 16, which can also be a divider mirror 24 (FIG. 3) or a full mirror 16a (FIG. 4), a subsequent bending of the imaging beam is provided in the direction of a fifth deflection element 18, disposed in the optical axis 4. It is emphasized that it is necessary to provide a pentaprism (in FIG. 2, position 18, in FIG. 4, position 14b) or a similarly effective mirror combination (in FIG. 3, sixth or seventh deflecting element 20+21), at one and only one of the imaging beam path bending positions, where the components 12, 14, 16, or respectively, 18 (FIG. 2) are disposed.

After 90 degree deflection of the imaging beam in the direction of the—in the present case vertical—optial axis 4, the imaging beam passes centrally through the top-mounting stop surface 6 of the binocular housing 5 and passes into the proper binocular tube after total reflection at the larger cathetus face ("Center" 19a) and subsequent reflection at the hypothenuse face of the deflecting prism 19. A beam splitting, instead of the total reflection, occurs at the cathetus face of the deflecting prism 19 if the binocular tube 5 is provided with a photo connecting piece 6a and a microphotographic or photometric evaluation of the microscopic picture is intended.

The imaging beam leaving the deflecting element 16, 16a or 24 in the inverted variants shown in the FIGS. 1b and 1c, passes the face of the stand arm A directed toward the observer centrally through the side-mounting stop surface 7 of the binocular housing 5 at the front. From there, the beam is lead by deflecting elements (not shown) into the binocular tube.

The incident light beam starts at a light source (not shown) which is disposed in an illuminating unit 28. The illuminating unit is mechanically and electrically connected to the microscope basic body G via a flanging mount 32 remote from the observer. The two illuminating units 27 and 28 can be exchangeably adapted and be supplied with energy internally or externally, as is described, for example, in the German Patent Application DE-OS 2,902,961. The incident light illumination partial beam 10 is led into the objective 1 via a first divider mirror 11 disposed in the optical axis 4 and from there to the object 3.

In a conventional way, diaphragms (for example, a field diaphragm 58), optical systems (for example, an optical system 59) and filter inserts (not shown) can be provided in the incident light partial beam 10. Also, for example, a plug-in can be provided, for an analyser or a component for the realization of fringe contrast, between the first divider mirror 1 and the second deflecting element 12. Similarly, it is possible or, respectively, necessary to provide corresponding filter plug-ins 8a (compare FIG. 2) as well as diaphragms, in the transmitted light partial beam 8 and optics (not shown) and optical systems 13, 15, and 17 in the entire bent imaging beam path, between the building elements 12, 12a on the one hand and 18, 18a, 20 on the other hand.

As can be recognized from FIG. 3, a camera attachment 23 can be optically coupled as an extension of the imaging beam path running in the stand support T, if, instead of the fourth deflection element 16 or, respectively, 16a, a second divider mirror 24 capable of being inserted into the path of the beam is provided. Of course, this is also possible at another location, for example between the deflecting elements 16a and 18a. Part of the imaging beam is branched off into a projection viewing screen 22 by way of a pivotably disposed divider mirror 25 in the case shown in FIG. 4. The ground glass screen 22a of the viewing screen is also viewable for the observer B unimpededly and directly and without changing the ergonomically optimum microscoping position.

Instead of the optical branching locations (at 24 or, respectively, 25) shown in FIGS. 3 and 4, however, other, or additional intersecting positions reflecting into, or reflecting out of the image path are possible. For example, if, as shown in FIG. 4, the construction is only conceived as a transmitted light inverted embodiment, then already a further camera component (film camera, instant camera and the like) can be adapted to the side of the stand base F remote from the observer B, as an extension of the imaging partial beam path 38. However, an optical branching device, for example, for a television camera is possible also in the region of the vertical stand support T. At any rate, providing side attachment modules in the region close to the observer is to be avoided for ergonomic reasons.

A high aperture special condenser 2a is shown in FIG. 3 instead of the simple, insertable survey condenser 2 shown in FIGS. 2 and 4, and the special condenser is attached to an additional support holder on the object stage 26. Even if up to now the component 5 has been uniformly designated as a binocular housing, it is also possible to provide in its place a monocular, a trinocular housing, a discussion bridge or an intermediate housing, from which the observer beam path runs in the direction of the binocular housing, or the like. Similarly the component 5 has to be adapted to its mounting stop surface or, respectively, to its optically effective center in each case.

As can be recognized from FIG. 5a, a large object stage space for large volume sample containers can be used according to the novel conception according to the invention without the fundamental advantages recited above having to be dispensed with.

However, in order also to place or, respectively, position extremely dimensioned sample containers such as penicillin flasks 3a, Erlenmeyer flasks 3b, and the like, onto the object stage, the device can also be arranged such as is recognizable from FIGS. 5a and 5b. A swinging of the stand arm A is provided around an axis 29, which coincides with the axis of the part of the imaging beam bundle passing the stand support T. The swinging plane in the case shown is disposed at the intersecting position 30 between the stand arm A and the stand support T. However, it is also possible for the intersecting position between the spacially fixed remaining lower part of the microscope basic body G and its swingable upper part to be disposed within that region of the stand support T, defined in its lower limit by position of the object stage 26 adjusted to minimum spacing to the objective 1, and defined in its upper limit by the flange mounting area 31 for the transmitted light illuminating unit 27.

In FIG. 5b a 180 degree swinging of the stand arm A is shown, while in FIG. 5a the base position is shown, which, in principle, does not distinguish from the arrangements shown in FIGS. 2 and 4. A spacer arm 33 is attached to the flange mount position 31. The arm is provided with a mechanical and electrical coupling mechanism analogous to that of the transmitted light illuminating unit 27. A height-adjustable, special, transmitted light illuminating device 35 can be attached to the spacer arm 33 in the manner of an optical bench. The illuminating device 35 comprises a light source 37, a deflection element and a lock screw 36, and is followed by a second condenser 34. The sequence (from bottom to top) of objective 1, object 3b, condenser 34 is also retained in the case shown in FIG. 5b. If one wants only to realize the incident light inverted embodiment in an apparatus, then a small swing of the rotatable upper part is sufficient, since then the condenser 34 is eliminated and in a sense is replaced by the objective 1, acting like a condenser. With only a slight pivoting of the upper part, advantageously, the direct observation of the object 3a or, respectively, 3b can be retained completely and all usual handling procedures of the sample and manipulations of the object can be performed directly by the observer.

In addition, an incident light fluorescence arrangement can be realized in the stand base F. This is illustrated in more detail in FIGS. 6a and 6b.

The part of the stand base F directed to the observer having the attached lens turret and the object stage 26 disposed above it, is shown as a side view in FIG. 6a. Means for the proper positioning and sliding (in the direction of the arrow 41b) of fluorescence units 42 or, respectively, 43, formed as structural and functional components, are provided as a drawer-like support 39, which, for example, by way of a drive knob 44 or of a handle not shown, can be pulled out in the direction of the observer (in the direction of the arrow 39a) from the stand base F. In addition to the drive knob 44, these means comprise a drive wheel 5 connected via a shaft 44a to the drive knob 44. The drive wheel 45 cooperates with a gear rack 41a, which is connected to a mount holder 41 disposed cross-slidably on a guide rod 46. In addition, at least three dovetail recesses parallel to the optical axis 4 are provided at the mount holder 41, into which recesses cubically-shaped fluorescence units 42, 43 can be exchangeably inserted. In each case, they comprise an exciting filter 48 or, respectively, 49, a dichromatic divider mirror 50 or, respectively, 51 as well as a blocking filter 52 (the blocking filter belonging to the fluorescence unit 43 is not shown).

The fluorescence unit 42 is disposed, according to FIG. 6b, exactly centered and aligned at the optical axis of the microscope. The exact positioning of the fluorescence units 42, 43 is effected by engagement means not shown. If other mutually adapted fluorescence units are to be brought in the path of the beam 10 (and partially 4) as is necessary for multiple fluorochrome techniques, then this is accomplished by simply pulling out the mounting 39 in the direction of the arrow 39a, which is provided for this purpose with locking means 40, 40a, and accomplished by uncomplicated and rapid exchanging of the corresponding fluorescence cube. The mounting 39 can then be inserted again into the stand base F up to the stop edge 47 whereby an exact coordination to the optical axis 4 of the microscope is assured.

In order to align a special fluorescence unit, which can be attached to the flange mount position 32 instead of the usual incident light illumination unit 28, an alignment insert 53 is provided, which can be inserted interchangeably into one of the dovetails provided in the mount holder 41, or which can be permanently disposed there. The alignment insert 53 is shown in FIG. 6c. It resembles in its outer shape the fluorescence units 42, 43. A light damping filter 5 is positioned instead of the exciting filter 48, or 49, respectively, and a (full) mirror 56 is positioned instead of the dichromatic divider mirror 50, or 51. The end on the objective side is provided by a ground glass screen 54 with a centering mark 57. An illuminating beam coming from the fluorescent light source 60 and running along the axis 10 passes an optical system 59 after leaving of the illuminating field diaphragm 58. The optical system 59 images the field diaphragm 58 into the object 3. The lamp coil or the electric arc of the light source 60 is imaged onto the centering mark 57. The light damping filter 5 serves to avoid possible overexposures. The alignment of the light source 60 is provided by the observer B when mounting 39 is pulled out, by looking directly onto the ground glass screen and by correcting possible misalignments. Of course, for this purpose, initially bringing the alignment insert 53 into a position defined by the axis 10 is required.

The advantages of this fluorescence arrangement are in particular that the fluorescing object is disposed very low with respect to the ergonomically favorable microscoping position of the observer B. It is in fact possible to insert fluorescence inserts into the object support in a known inverted microscope (DE-GM 7,628,471), however the object support is disposed at a very high level based on the construction selected, which is not considered an optimum solution for the user from an ergonomic point of view. A revamping to fluorescence investigation operation succeeds, if at all, in other inverted microscopes of conventional construction only with expensive mechanical and optical changes. For example, it is required to exchange an object support for a complicated fluorescence illuminator and to dispose the object stage at a higher level, where, for example, one loses already aligned object locations from the field of view.

All these disadvantages are avoided, according to the invention, by integrating the fluorescence illumination arrangement and a part of the imaging beam path in the stand base F.

We claim:

1. A combination transmitted light and incident light inverted microscope, comprising:
   (a) a substantially horizontal stand base;
   (b) a substantially vertical stand support connected with the stand base;
   (c) an objective disposed on the stand base;

(d) a substantialy horizontal stand arm connected with the stand support, wherein the stand base, the stand support and the stand arm define a "C"-shaped basic microscopic body, and wherein the basic microscope body defines a free opening directed toward a viewer;

(e) means for holding an object to be viewed, disposed in said free opening;

(f) a condenser for condensing illuminating light onto the object;

(g) an optical axis defined by the objective, the object and the condenser;

(h) an optical path disposed in the basic microscope body, and including an imaging partial beam originating at the object and extending within said stand base, said stand support and said stand arm;

(i) illuminating beam means for producing an illuminating beam, said illuminating beam means being selected from the group consisting of (1) a transmitted light illuminating beam which before striking said object runs in said stand arm essentially parallel to the imaging partial beam travelling along said optical path in the stand arm, (2) an incident light illuminating beam which before striking said object runs in said stand base essentially parallel to the imaging partial beam travelling along said optical path in the stand base, and (3) a combination of a transmitted light illuminating beam which before striking said object runs in said stand arm essentially parallel to the imaging partial beam travelling along said optical path in the stand arm, and an incident light illuminating beam which before striking said object runs in said stand base essentially parallel to the imaging partial beam travelling along said optical path in the stand base; and (j) ocular means, attached to the stand arm, for converting the imaging partial beam into a viewable image.

2. An inverted microscope according to claim 1, further comprising a top-mounting stop surface disposed on top of said stand arm, and for attaching said ocular means.

3. An inverted microscope according to claim 2, wherein said ocular means comprise a binocular housing and wherein said optical axis centrally transfixes the binocular housing.

4. An inverted microscope, as claimed in claim 3, further comprising a first deflecting element, disposed along said optical axis and at a 45 degree angle to the axis, for deflecting said transmitted light illuminating beam into said condenser.

5. An inverted microscope, as claimed in claim 4, further comprising a divider mirror, disposed on said optical axis and at a 45 degree angle to said axis, and for deflecting said incident light illuminating beam into the objective and onto the object.

6. An inverted microscope, as claimed in claim 5, further comprising a second deflecting element and for deflecting the imaging beam originating at the object and passing said objective and dividing mirror; a first optical system for receiving the imaging beam from the second deflecting element; a third deflecting element for deflecting the the imaging beam from the first optical system along the stand support; a second optical system for receiving the imaging beam from the third deflecting element; a fourth deflecting element, disposed in said stand arm, for deflecting the imaging beam from the second optical system; and a third optical system for receiving the imaging beam from the fourth deflecting element.

7. An inverted microscope, as claimed in claim 6, further comprising a fifth deflecting element, disposed on said optical axis between said top-mounting stop surface and said first deflecting element, for deflecting the imaging beam from the third optical system; and a deflecting prism, disposed in said binocular housing for deflecting the imaging beam from the fifth deflecting element.

8. An inverted microscope, as claimed in claim 6, further comprising a sixth deflecting element, disposed outside of said optical axis, for deflecting the imaging beam from said third optical system; and a seventh deflecting element, disposed on the optical axis between the top-mounting stop surface and the first deflecting element, and disposed at an angle of 67.5 degrees to the optical axis.

9. An inverted microscope, as claimed in claim 6, further comprising optical branching means, disposed in said optical path, for branching said imaging beam; at least one functional unit for receiving the branched image beam; and means, in said basic microscope body, for coupling the functional unit.

10. An inverted microscope, as claimed in claim 9, wherein said functional unit comprises a fluorescence unit, and further comprises a mounting for positioning the fluorescence unit disposed in the stand base.

11. An inverted microscope, as claimed in claim 10, further comprising an alignment insert including a light damping filter, a mirror, and a ground glass screen having a centering mark, wherein the alignment insert is disposed on said mounting, and wherein the mouting slides relative to said optical axis.

12. An inverted microscope, as claimed in claim 9, wherein said branching means comprise at least one beam divider insertable in said optical path.

13. An inverted microscope, as claimed in claim 9, wherein said means for coupling the functional unit comprise a movable divider mirror insertable in said optical path, and disposed after said fourth deflecting element.

14. An inverted microscope, as claimed in claim 9, wherein said means for coupling the functional unit comprise a beam divider interchangeable positioned with said fourth deflecting element, and disposed at an intersection point between said stand support and said stand arm.

15. An inverted microscope, as claimed in claim 9, wherein said optical branching means are disposed in said stand support, and between said third and fourth deflecting elements.

16. An inverted microscope, as claimed in claim 1, wherein said stand support and said stand arm are integral.

17. An inverted microscope, as claimed in claim 1, wherein the basic microscope body, defined by the stand base, the stand support and the stand arm, is integral.

18. An inverted microscope, as claimed in claim 1, wherein said means for holding an object to be viewed comprise an object stage, including means for adjusting a relative distance between the oject stage and the objective.

19. An inverted microscope, as claimed in claim 1, wherein said illuminating beam means comprise a transmitted light illuminating unit, insertable in said stand arm, and for producing said transmitted light illuminating beam; and wherein said illuminating beam means comprise an incident light illuminating unit, insertable in said stand base, and for producing said incident light illuminating beam.

20. An inverted microscope, as claimed in claim 19, further comprising an internal energy supply for said illuminating units.

21. An inverted microscope, as claimed in claim 19, further comprising an external energy supply for said illuminating units.

22. An inverted microscope, as claimed in claim 19, further comprising means for attaching said illuminating units, disposed in said stand support and directed away from said free opening.

23. An inverted microscope, as claimed in claim 1, wherein said stand arm is pivotable about said stand support, and about an axis defined by a section of said optical path passing through said stand support.

24. An inverted microscope, as claimed in claim 1, wherein said basic microscope body comprises an upper pivotable part and a lower fixed part, wherein said upper and lower parts meet at a juncture point between a mounting flange for a transmitted light illuminating until and a lowest position of said means for holding an object.

25. An inverted microscope, as claimed in claim 1, wherein said means for holding an object comprise an object stage, and wherein the object stage is directly supported on said stand base in a height-adjustable manner.

26. An inverted microscope, as claimed in claim 25, wherein said juncture point is disposed at an upper limit of said stand base.

27. An inverted microscope, as claimed in claim 25, further comprising a transmitted light illuminating device, mounted on said mounting flange, and including a second condenser, and a spacer arm.

28. An inverted microscope, a claimed in claim 27, wherein said transmitted light illuminating device comprises means for adjusting a distance between the second condenser and said means for holding an object.

29. An inverted microscope, as claimed in claim 28, wherein said transmitted light illuminating device comprises a light source and an internal electrical energy supply for the light source.

30. An inverted microscope according to claim 1, further comprising a side-mounting stop surface disposed on a first end of said stand arm, and for attaching said ocular means, wherein a second-end of said stand arm is attached to said stand support.

31. An inverted microscope according to claim 30, wherein said ocular means comprise a binocular housing, and wherein said imaging partial beam centrally transfixes the binocular housing.

32. An inverted microscope according to claim 1, wherein said objective comprises a lens turret.

33. An inverted microscope, as claimed in claim 1, wherein said stand support and said optical axis are substantially vertical, wherein said stand arm and said stand base are substantially horizontal, and wherein said basic microscope body defines a canted "C" shape.

34. An inverted microscope, as claimed in claim 1, further comprising an intermediate housing attached to said stand arm, and having a stop surface for attaching said ocular means.

35. An inverted microscope, comprising:
(a) a substantially horizontal stand base;
(b) a substantially vertical stand support connected with the stand base;
(c) an objective disposed on the stand base;
(d) a substantially horizontal stand arm, shorter than the stand base and having a first end connected with the stand support, wherein the stand base, the stand support and the stand arm define a "C"-shaped basic microscope body, and wherein the basic microscope body defines a free opening directed toward a viewer;
(e) means for holding an object to be viewed;
(f) an optical axis defined by the objective and the object;
(g) an optical path disposed in the basic microscope body, and including an imaging partial beam originating at the object and extending within said stand base;
(h) means for producing an incident light illuminating beam wherein the imaging partial beam and the incident light illuminating beam before it strikes the object run essentially parallel in the stand base; and
(i) ocular means, attached to the stand arm, for converting the imaging partial beam into a viewable image.

36. An inverted microscope, as claimed in claim 35, wherein said objective comprises a lens turret.

37. An inverted microscope, as claimed in claim 35, further comprising a side-mounting stop surface for attaching said ocular means, and disposed on a first end of said stand arm, wherein a second end of said stand arm is connected with said stand support, wherein said ocular means comprise a binocular housing, and wherein said optical axis centrally transfixes the binocular housing.

* * * * *